May 10, 1960  W. J. KELLY  2,936,200
THRUST BEARINGS
Filed Nov. 8, 1957

INVENTOR.
Winton J. Kelly
BY
Pennie, Edmonds, Morton, Barrows & Taylor
ATTORNEYS

United States Patent Office 2,936,200
Patented May 10, 1960

2,936,200

THRUST BEARINGS

Winton J. Kelly, Birmingham, Mich., assignor to Miniature Precision Bearings, Inc., Keene, N.H., a corporation of New Hampshire Application November 8, 1957, Serial No. 695,322

4 Claims. (Cl. 308—196)

This invention relates to improvements in bearings, and more particularly to improvements in ball bearings mounted on shafts and adapted to take thrust loads. This application is a continuation-in-part of a copending application by Winton J. Kelly, Serial No. 609,369, and filed September 12, 1956.

Frequently a ball bearing mounted between a shaft and outer housing to facilitate rotation is also required to restrain axial displacement therebetween when either the shaft or housing is subjected to an axial or thrust load. Such displacement is normally prevented by securing the inner race of the bearing to the shaft by means of auxiliary units, such as lock nuts or locking collars. This expedient is unsatisfactory in many instances, primarily due to the space demands of the auxiliary units and the expense in time, labor, and parts required for their assemblage.

The present invention provides an improved thrust bearing wherein a ball bearing is secured to a shaft to take a thrust load without the need of auxiliary units.

According to the present invention the shaft is provided with an annular recess having a diameter equal to or slightly less than the diameter of the bearing inner race. The inner race of the ball bearing is then fractured at one point lengthwise of its longitudinal axis. In this way the inner race may be opened to a larger than normal diameter enabling it to be slipped over the shaft into a close fit within the annular recess. Due to the negative tolerance of the recess diameter relative to the inner race, the fractured ends of the race will abut to form a unitary ring providing an uninterrupted and smooth raceway for the balls. In addition, the radial shoulders provided by the annular recess secure the shaft against axial movement relative to the inner race thus providing the desired axial restraint.

Normally it is desirable to mount the ball bearing as a complete unit upon the shaft, thus eliminating the fuss and bother of assembling the bearing thereupon. This may be effected in the present invention by fracturing the outer as well as the inner race of the ball bearing in the manner above described. In this way the entire ball bearing may be expanded as a unit and slipped over the shaft into the annular recess. Or, if desired, the inner race of the ball bearing may be first mounted within the recess and then the fractured outer race expanded into position over the balls positioned therebetween.

Often, however, due to the lack of space between the shaft and outer housing it may be impossible to expand the fractured outer race of the bearing into position relative to the shaft recess. Accordingly, the present invention provides an alternative embodiment enabling assembly of the bearing in such instance. In this embodiment the bearing again employs a fractured inner race which is expanded into position within the annular recess. The outer race is then simply slipped over the shaft into position relative to the housing. It is therefore evident that the outer race need not be fractured in this instance. Finally, means are provided for filling balls between the inner and outer races to complete the bearing assembly. Advantageously such means comprise filling notches in both the inner and outer races which, when aligned, permit the introduction of balls between the races. Alternative means for assembling the bearings may also be employed, such as for example, eccentric displacement.

The invention will be further described in connection with the accompanying drawings illustrative of certain embodiments thereof, but it will be understood that the invention is not limited thereto.

Figure 1:
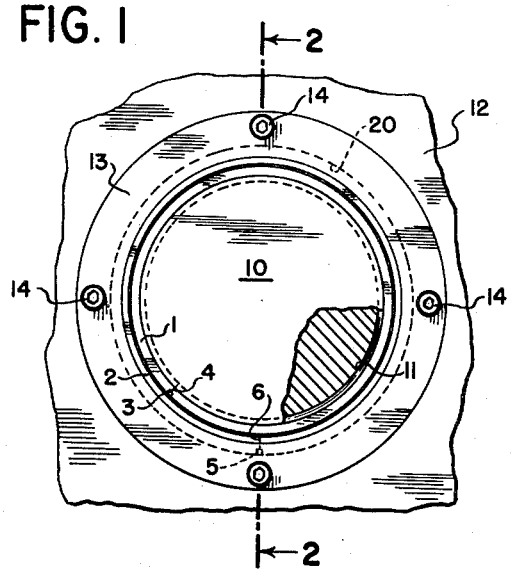
Fig. 1 is an end view or elevation of the thrust bearing having fractured inner and outer races.
Figure 2:
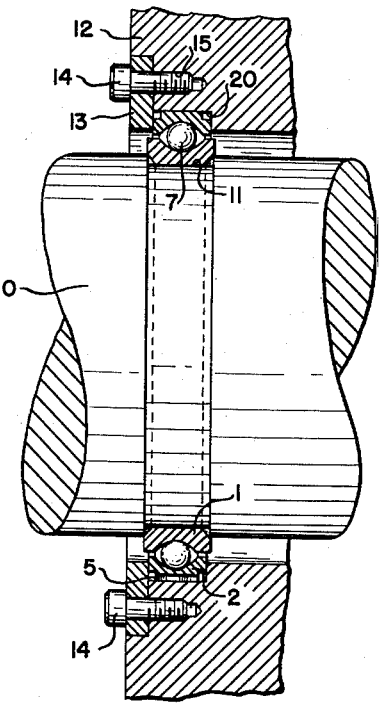
Fig. 2 is a sectional view on the line 2—2 of Fig. 1.

In Figs. 1 and 2 the inner race 1 and outer race 2 of the ball bearing are made of steel, machined and heat treated, and each is provided with a single fracture. The inner race 1 has a groove 3 to facilitate fracturing and has the fracture illustrated at 4. The outer race 2 has a similar groove 5 which is fractured at 6. The method of fracturing the rings is that described in U.S. Patent No. 2,648,578, and the races may be assembled with the balls 7 therein as described in said patent.

The fracture in the races enables them to be spread apart thus giving the entire bearing an expansible nature. The tendency, however, is for the fractured races to return to a normal closed position with the faces of the fracture in contact, thus giving the ball bearing a smooth uninterrupted raceway surface.

The inner diameter of the inner race 1 of the bearing is made smaller than the outer diameter of the shaft 10. The shaft is provided with an annular recess 11 machined to a diameter equal to or slightly less than the inner diameter of the inner race 1. The expansible nature of both the inner and outer races enables the bearing to be spread apart wide enough to be slipped on over the shaft and into the recess 11. Due to the negative tolerance of the diameter of the annular recess 11 the bearing contracts to a tight fit in the annular recess while returning to its normal condition with its fractured ends abutting to form an integral ring.

The bearing assembly is then completed by sliding the shaft and ball bearing into position in an outer housing 12 which has an annular opening 20 for the reception of the outer race 2. The outer race is then secured in position within opening 20 by means of a plate 13 and bolts or screws 14 threaded into openings 15 in the housing.

When a thrust load is applied either to the shaft 10 or the housing 12, the outer race 2 of the bearing tends to shift axially with respect to the inner race 1. The force thus created is imparted through the balls 7 in an angular direction to the inner race 1, each ball sharing the thrust load equally. The angle of this force vector is proportional to the internal tightness of the bearing. The inner race 1 therefore exerts an axial force component against the radial shoulders formed by the recess 11. However, due to the tight fit of the inner race within the recess, the axial displacement of the bearing is restrained, thereby preventing the shaft from shifting with respect to the housing under the influence of the applied thrust load.

Since no axial shift is permitted, the bearing races and balls remain in operative relationship. In addition, the races in their normal condition with fractured ends abutting provide a smooth and continuous raceway for the bearing balls. Thus the bearing, though subjected to a thrust load, does not interfere with the rotation of the shaft.

It should be noted, however, that care should be taken dimensionally in order for the improved thrust bearing of the invention to operate optimally. This applies not only to the relative diameters of the recess 11 and inner race 1, but also to the dimensional relationships of the groove 20, outer race 2, and balls 7. All these elements cooperate with the inner race and recess in preventing axial displacement of the shaft due to applied thrust loads.

At times, it may be desirable to assemble the bearing on the shaft directly rather than to mount it thereon as a unit. The fractured inner and outer race construction is adaptable to such assembly. The inner race 1 is first expanded, slipped over the shaft, and located in the recess 11. The balls 7 are then positioned within the inner race, while the outer race 2 is expanded over the balls into position to form the assembled bearing.

Figure 3:
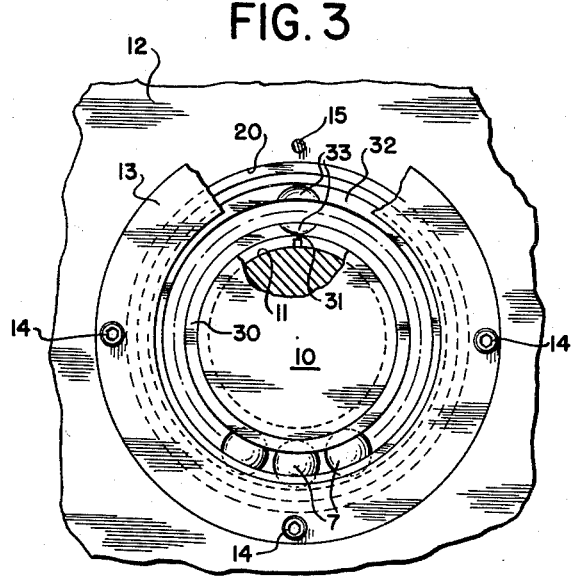
Fig. 3 is an end view or elevation of the thrust bearing having a fractured inner race and a continuous outer race.

In some instances it may be unfeasible to slide the shaft and ball bearing into position within the housing. In that event there may not be enough room to spread out the fractured outer race of the expansible bearing into position. For this reason the invention provides a further embodiment as illustrated in Fig. 3, in which parts similar to those in Fig. 1 are similarly identified. In this embodiment the inner race 30 of the bearing is fractured at 31 so that it may be expanded over the shaft 10 and into position within the recess 11. Due to the lack of room preventing the use of an expansible race, a continuous outer race 32 may be advantageously employed. The outer race 32 is slipped into position within the opening 20 reserved therefor in the housing 12. The outer race is then axially restrained in the opening by means of plate 13 and the bolts or screws 14 threaded into openings 15 in the housing. To complete the assembly means are provided for inserting balls 7 between the inner and outer races 30 and 32. In this embodiment filling notches 33 are employed for this purpose. These notches are dimensioned so that when the races are positioned with the notches in alignment, balls may be inserted through the notches between the inner and outer races in the raceway provided. Thus assembly of the total bearing is enabled where little space is available. It should be noted, however, that a filling notch assembly as in Fig. 3 is only practical where the bearing does not make a complete revolution so that lining up of the filling notches may be prevented.

The present invention has been advantageously employed in swivel joints for conducting liquids or gases through pipes and in variable pitch propellers. In both cases a substantial advantage has been realized in performance, and in the elimination of auxiliary parts to secure the inner race to the shaft member.

Where the term "balls" has been used hereinbefore and is used in the appended claims, it is intended to include within its meaning all forms of rolling elements employed between the races of a bearing.

A preferred embodiment of the invention has been described. Various changes and modifications may be made in the scope of the invention as set forth in the appended claims.

I claim:

1. A thrust bearing including inner and outer races with balls between them, the inner race having a single fracture lengthwise of its longitudinal axis and forming a unitary ring with a pair of abutting broken ends, and a shaft having an annular recess therein, said inner race surrounding and closely fitting the shaft within said annular recess.

2. A thrust bearing including inner and outer races with balls between them, each of said races having a single fracture lengthwise of its longitudinal axis and forming a unitary ring with a pair of abutting broken ends, and a shaft having an annular recess therein, said inner race surrounding and closely fitting the shaft within said annular recess.

3. A thrust bearing including inner and outer races with balls between them, the inner race having a single fracture lengthwise of its longitudinal axis and forming a unitary ring with a pair of abutting broken ends, and a shaft having an annular recess therein, said inner race surrounding and closely fitting the shaft within said annular recess, and both said races being provided with filling notches for the insertion of said balls therebetween.

4. An expansible steel ballbearing comprising inner and outer races with balls between them, said inner and outer races being machined to their final dimensions both inside and out, and each of said races having a single fracture lengthwise of its longitudinal axis and forming a unitary ring which, in its normal condition, forms a full, perfect circle with a pair of abutting broken ends mating together exactly, said races being capable of expansion when pressure is applied to the inner race by expansion of the shaft, and said races having the inherent property of contracting when the applied pressure is reduced.

References Cited in the file of this patent

UNITED STATES PATENTS

| | | |
|---|---|---|
| 2,648,578 | Stearns et al. | Aug. 11, 1953 |
| 2,650,864 | Mergen | Sept. 1, 1953 |
| 2,817,543 | Corsette | Dec. 24, 1957 |